United States Patent [19]

Torck

[11] 3,867,476

[45] Feb. 18, 1975

[54] ISOMERIZATION OF SATURATED HYDROCARBONS WITH HEXAFLUOROANTIMONIC ACID AND A METAL CATION

[76] Inventor: Bernard Torck, 86, Route de Maisons 78400, Chatou, France

[22] Filed: Oct. 13, 1972

[21] Appl. No.: 297,432

[30] Foreign Application Priority Data
Oct. 15, 1971 France .............................. 71.37264

[52] U.S. Cl.......................... 260/683.68, 260/666 P
[51] Int. Cl................................................ C07c 5/28
[58] Field of Search ....... 260/683.68, 683.65, 666 P

[56] References Cited
UNITED STATES PATENTS

| | | | |
|---|---|---|---|
| 2,392,924 | 1/1946 | Ipatieff et al. ................ | 260/683.68 |
| 3,201,494 | 8/1965 | Oelderik et al. ................ | 260/683.68 |
| 3,250,819 | 5/1966 | Cabbage ......................... | 260/683.68 |
| 3,766,286 | 10/1973 | Olah .............................. | 260/683.68 |

*Primary Examiner*—Delbert E. Gantz
*Assistant Examiner*—G. J. Crasanakis
*Attorney, Agent, or Firm*—Millen, Raptes & White

[57] ABSTRACT

Process for isomerizing saturated hydrocarbons at low temperature comprising contacting the same with an essentially liquid catalyst containing hexafluoroantimonic acid and a cation of a metal from groups I to III of the periodic classification of elements, particularly lithium, sodium, potassium, cesium, beryllium, calcium, thallium, indium, copper, silver, zinc, cadmium, mercury or cerium, in the form of a halide or a halogenosulfonate.

12 Claims, No Drawings

ISOMERIZATION OF SATURATED HYDROCARBONS WITH HEXAFLUOROANTIMONIC ACID AND A METAL CATION

This invention concerns the conversion and, more particularly, the isomerization of saturated hydrocarbons at low temperature by using a catalyst formed of a complex of hexafluoroantimonic acid with metal ions. It concerns more particularly an isomerizing process which, as compared with the prior processes, is more selective and provides an isomerization product having a higher octane number, with the use of a catalyst having a longer life time.

A very wide range of catalysts are known for carrying out this reaction. The older and well known catalysts are those of the FRIEDEL-CRAFTS type. Many processes have been contemplated, which make use of aluminum chloride, in particular either as a solid or in solution, for example, solution of aluminum chloride in melted antimony trichloride. Other solid catalysts such as the so-called hydroisomerization catalysts, contain alumina supporting platinum.

It is advantageous to conduct the isomerization of n-paraffins at low temperature. As a matter of fact, the thermodynamic equilibrium favors the formation of the iso-paraffins as the temperature decreases. The catalysts containing alumina are active in the range of 85° to 120° C. The most active hydro-isomerization catalysts of the platinum chlorinated alumina type may perform the isomerization at temperatures in the range of 130°–150°C.

The catalysts containing hexafluoroantimonic acid, which are well known as capable of isomerizing n-paraffins, are very active at 25°C and provide effluents having an iso-paraffin content which is high enough to avoid the necessity of removing or recycling the n-paraffins to the isomerization step when it is desired to obtain gasoline cuts having a high octane number. The hexafluoroantimonic acid may be used either in its protonic form H SbF6, or in that form in which H is replaced by a radical R of a saturated hydrocarbon, and more particularly, by a cyclic hydrocarbon radical. As such, this catalyst is very active for isomerizing aliphatic hydrocarbons but it appears that, during the isomerization, dismutation and cracking reactions may occur at a substantial rate and form polymeric compounds, and cracking products having a molecular weight lower than that of the feed. The formed unsaturated polymers will tend to be detrimental to the catalyst. This dismutation and cracking generally increase with a higher reaction temperature and/or with a longer chain of the aliphatic hydrocarbons.

It is known to use hydrogen to inhibit the dismutation and cracking reactions, the extent of the effect being greater when the hydrogen pressure is higher. However, very high hydrogen pressures may favor secondary reactions, some of which result in the deterioration of the catalyst by reduction. It has also been observed that, in order to obtain a catalyst having an acceptable life time, it is necessary to deactivate the catalyst to such an extent that its activity is only from 5 to 10 % of the activity of the fresh catalyst. This deactivation may be obtained by contacting the fresh catalyst with a hydrocarbon feed under such conditions that dismutation and cracking produce unsaturated compounds which form complexes with the hexafluoroantimonic acid and deactivate the same.

It has now been observed according to this invention that, when using hexafluoroantimonic acid in the presence of certain metal cations, the dismutation and cracking reactions are inhibited to a large extent; and of particular importance it is possible to carry out the reaction with much lower hydrogen pressures, and accordingly permitting an increase in the catalyst life time.

This catalyst may be used in a normally liquid form or in a diluted form. The diluents which may be used may be anhydrous and soluble only to a small extent in the hydrocarbons to be isomerized. As examples of convenient diluents, there can be mentioned anhydrous hydrofluoric acid and/or sulfurous anhydride, or fluorosulfonic acid. The use of a diluent results in the production of a homogeneous liquid phase having a density which may be adjusted at will and which dissolves the compounds formed by association of hexafluoroantimonic acid and metal ions. The diluent amount may vary within a wide range, the maximum being dependent, on the one hand, on the fact that the formed complexes must be insoluble therein and, on the other hand on the fact that, the catalyst and hydrocarbon phases must be quickly separable by decantation after emulsification.

The preferred diluent is hydrofluoric acid. The molar ratio of $HF/SbF_5$ may range from 1 to 1,000, but is preferably from 10 to 200. When using hydrofluoric acid as diluent, hexafluoroantimonic acid may be prepared in the reactor by reacting hydrofluoric acid with antimony pentachloride while removing hydrochloric acid.

The metal cations which may be used according to the invention, may be introduced in the form of halides or halogenosulfonates of metals pertaining to groups I,II,III of the periodic classification of elements. The halogens of these metal salts may be fluorine, chlorine, bromine, iodine but the most convenient halogen if fluorine, and the metal fluorides which are more advantageously used are the lithium, sodium, potassium, cesium, beryllium, magnesium, calcium, strontium, barium, boron, aluminum, gallium, indium, thallium, copper, silver, zinc, cadmium, mercury, scandium, yttrium, lanthanum and cerium fluorides or the acid fluorides of formula $(FH)nFMe$, in which Me is a metal.

These metal fluorides may be used in combination with hexafluoroantimonic acid, either alone or in mixture. The amount of metal fluoride is generally from $10^{-3}$ to about 2 moles per mole of hexafluoroantimonic acid, this ratio being more particularly selected in the range from 0.01 to 0.8.

Instead of using directly a halide or halogenosulfonate of a metal from groups I to III, there can be used another compound of these metals or the metal itself, provided that it is capable of being dissolved in the reaction mixture and of forming the corresponding fluorides or fluorosulfonates.

The metal fluorides inhibit the dismutation and cracking reactions. However, although these compounds have a favorable effect, even when they are used without adding other known inhibitors, it is desirable to carry out the reaction in the presence of certain inhibitors and more particularly in the presence of hydrogen. The partial hydrogen pressure may however be relatively small and it depends on the reaction temperature and on the metal fluoride which is used. For example, if lithium fluoride is used at 25°C, it is desirable to carry out the isomerization of paraffins in the presence of hydrogen at a partial pressure which may be from 1 to 2 Kg/cm$^2$.

The feed will be preferably free from unsaturated compounds, particularly dienic hydrocarbons, as well as sulfurous compounds and water. On the contrary the presence of naphthenic compounds is not detrimental and, is some cases, such compounds as, for example, cyclohexane or methylcyclopentane will have a beneficial effect on the operation of a catalyst comprising hexafluoroantimonic acid and metal fluorides.

The use of metal fluorides in combination with hexafluoroantimonic acid in the presence of a diluent has the further advantage of making possible the adjustment of the catalyst vapor pressure without requiring the use of very high ratios of SbF$_5$ to HF. As a matter of fact, it is known that the metal fluorides will combine with acids such as for example, hydrofluoric acid to yield compounds which are solid at ordinary temperature, for example KF,2HF. It can thus be contemplated to make use of smaller amounts of SbF$_5$ without substantially reducing the catalyst activity.

Another advantage of the catalyst containing hexafluoroantimonic acid and metal halides is that it exhibits a lower corrosive action than when a hexafluoroantimonic acid is used alone.

The isomerization of saturated hydrocarbons may be conducted over a wide range of temperatures. However, it is preferable to make use of this catalyst at temperatures below 150°C and more particularly, within the range of from −20° to +75°C.

The present invention is thus concerned with a new catalyst and a process for isomerizing saturated hydrocarbons at low temperature, which process is conducted in such a manner that the hydrocarbon cracking is relatively low.

The saturated hydrocarbons which may be isomerized in the presence of this new catalyst are the aliphatic or naphthenic hydrocarbons, (whereby there may be obtained products with a higher octane number than that of the feed and which may be used in fuels), i.e., the aliphatic or naphthenic, branched or unbranched hydrocarbons having from 4 to 8 carbon atoms per molecule and more particularly the aliphatic or naphthenic hydrocarbons having from 4 to 6 carbon atoms, for example n-butane, n-pentane, n-hexane, methylpentanes, methylcyclopentane, cyclohexane or their mixtures. As examples of industrially available mixtures including these hydrocarbons, there can be mentioned the toppings from the crude oil distillation, the light naphtha fractions which may contain a certain amount of C$_7$ saturated hydrocarbons or some hydrogenated effluents of catalytic cracking. The isomerization of these mixtures results in an effluent which has a higher octane number than the feed and provides mixture components for obtaining equilibrated premium gasolines without requiring the removal of the n-paraffins which are only present therein in small amounts.

Although the preceding description particularly concerned the isomerization, the catalyst of the invention may obviously be used in other reactions of hydrocarbon conversion, particularly of saturated hydrocarbon conversion.

The following examples, are given by way of illustration and are, by no way, limitative of the scope thereof.

EXAMPLES 1 to 6

In a reaction vessel made of Teflon and having a capacity of 125 cc, there is introduced a certain amount of metal fluoride, 6.5 g of antimony pentafluoride, 30 cc of liquid hydrofluoric acid and 70 cc of n-hexane containing 1.4 % of methylcyclopentane. A hydrogen pressure of 1.5 Kg/cm$^2$ is established in the reactor. The reaction is conducted at 22°C by emulsifying the two phases by stirring. After various reaction times, a small amount of the hydrocarbon phase is withdrawn after the stirring is stopped and the two phases are allowed to settle. This hydrocarbon phase is neutralized and analyzed by vapor phase chromatography.

At the end of the experiment, the yields by weight are checked; they are close to 100 %; the results obtained are indicated in table I hereinafter.

EXAMPLES 7 to 12 n-pentane is isomerized in a reaction-decantation vessel, in which the respective reaction and decantation volumes are 120 and 130 cc; the reaction and the decantation vessels are both made of Teflon and interconnected through a device of Hastelloy C. Both phases are emulsified by a turbine of Hastelloy C. A certain amount of metal fluoride, 12 g of antimony pentafluoride, 65 cc of hydrofluoric acid and 110 cc of n-pentane are introduced into the reaction-decantation vessel. The vessel is then brought to a hydrogen pressure of 2Kg/cm$^2$. The reaction is carried out at 19°C by emulsifying with the turbine the two phases present in the reaction zone. The feed is circulated between the reaction vessel and the decantation vessel. After various reaction times, a small amount of the hydrocarbon phase which is contained in the decantation vessel is withdrawn. This phase is neutralized and analyzed by vapor phase chromatography.

The results are given in table II below.

TABLE I

| Example n° | 1 | 2 | 3 | 4 | 5 | 6 |
|---|---|---|---|---|---|---|
| Metal halide MF$_x$ | none | LiF | CsF | AgF | TlF | TlF |
| Molar ratio MF$_x$/ SbF$_5$ | 0 | 0.35 | 0.30 | 0.30 | 0.28 | 0.60 |
| Reaction time (hours) | 4 | 6.0 | 7.0 | 7.0 | 7.0 | 10.0 |
| Chromatography analysis of the effluent from the reactor. | | | | | | |
| Cut <C$_6$ % b.w of the effluent | 2.0 | 1.0 | 1.5 | 2.0 | 1.6 | 1.0 |
| Composition of the C$_6$ cut in % b.w. 2,2–DM B | 55.0 | 56.3 | 60.5 | 57.5 | 62.0 | 57.0 |
| 2.3–DM B+2M–P+3M–P | 40.8 | 39.5 | 36.4 | 38.5 | 34.3 | 39.1 |
| n C$_6$ | 4.2 | 4.2 | 3.1 | 4.0 | 3.7 | 3.9 |

TABLE I—Continued

| Example n° | 1 | 2 | 3 | 4 | 5 | 6 |
| --- | --- | --- | --- | --- | --- | --- |
| Cracking extent | | | | | | |
| Reaction time (hours) | 9.0 | 7.0 | 8.0 | 15.0 | 13.0 | 18.0 |
| Fraction <$C_6$ % b.w with respect to the effluent | 34.0 | 1.6 | 2.5 | 4.5 | 3.3 | 1.8 |

2–2 D M B = 2–2 dimethyl butane
2–3 D M B = 2–3 dimethyl butane
2–M P and 3 M P = 2 methyl-and 3 methyl-pentane n $C_6$ = normal hexane

TABLE II

| Example n° | 7 | 8 | 9 | 10 | 11 | 12 |
| --- | --- | --- | --- | --- | --- | --- |
| Metal halide $MF_x$ | none* | LiF** | AgF | $CuF_2$ | $BeF_2$ | $ZnF_2$ |
| Molar ratio $MF_x/SbF_5$ | 0 | 0.2 | 0.3 | 0.1 | 0.06 | 0.02 |
| Reaction time (hours) | 3 | 3.0 | 4.0 | 5.0 | 7.0 | 4.0 |
| Chromatography analysis of the effluent | | | | | | |
| Cut <$C_5$ % b-w based on the effluent. | 21 | 0.2 | 1.5 | 0.4 | 4.0 | 1.4 |
| Composition of the $C_5$ cut | | | | | | |
| Isopentane | 78 | 85.3 | 85.2 | 84.1 | 82.2 | 82.0 |
| n-pentane | 22 | 14.7 | 14.8 | 15.9 | 17.8 | 18.0 |
| Cut $C_6$ % b.w. based on the effluent. | 1.6 | 0.3 | 0.6 | 0.6 | 0.4 | 0.2 |
| Cracking extent | | | | | | |
| Reaction time in hours | 3.0 | 8.0 | 5.0 | 9.0 | 12.0 | 14.0 |
| Cut <$C_5$ % b.w. | 21.0 | 1.0 | 3.0 | 3.3 | 8.0 | 9.2 |

\* In this test which is used as control experiment, a substantial cracking is observed.
\*\* used in the form of LiF.HF.

EXAMPLES 13 to 23

The isomerization of n-pentane is carried out in the apparatus of examples 7 to 12, with the same amounts of antimony pentafluoride, hydrofluoric acid and n-pentane, at the same temperature and under the same pressure, the molar ratio of the metal compound to $SbF_5$ being 0.35 and the reaction time 10 hours. The results obtained are given in table III below.

TABLE III

| Example n° | Type of metal compound | Cut<$C_5$ % b.w based on the effluent | Isopentane % in the $C_5$ cut |
| --- | --- | --- | --- |
| 13 | LiCl | 1.1 | 85.1 |
| 14 | KCL | 3.5 | 84.8 |
| 15 | $SrF_2$ | 3.6 | 84.2 |
| 16 | $CaF_2$ | 1.5 | 85.0 |
| 17 | $BF_3$ | 1.8 | 84.8 |
| 18 | $AlF_3$ | 2.5 | 83.0 |
| 19 | $CdF_2$ | 5.0 | 82.5 |
| 20 | $HgF_2$ | 3.5 | 83.5 |
| 21 | $CeCl_3$ | 3.0 | 84.5 |
| 22 | $NaSO_3F$ | 1.4 | 85.0 |
| 23 | $LiSO_3Cl$ | 1.2 | 85.2 |

What I claim is:

1. A process for isomerizing a saturated hydrocarbon, said process comprising contacting the saturated hydrocarbon with an essentially liquid catalyst comprising:
   a. a hexafluoroantimonic acid selected from compounds $HSbF_6$ and $RSbF_6$ in which R is a saturated cyclic hydrocarbon, and
   b. a cation selected from the group consisting of lithium, sodium, potassium, cesium, beryllium, calcium, thallium, indium, copper, silver, zinc, cadmium, mercury or cerium.

2. A process according to claim 1 wherein said essentially liquid catalyst comprises $HSbF_6$.

3. A process according to claim 1, in which the catalyst is used with an anhydrous liquid diluent selected from hydrofluoric acid, fluorosulfonic acid and sulfurous anhydride.

4. A process according to claim 3 in which the liquid diluent is hydrofluoric acid, and is used in a molar ratio $HF/SbF_5$ from 1 to 1,000.

5. A process according to claim 1, wherein the cation is present in the form of a halide or a halogenosulfonate.

6. A process according to claim 5, wherein the halide is a fluoride.

7. A process according to claim 1, in which the molar ratio of the cation, expressed as fluoride, to the hexafluoroantimonic acid, is in the range of from $10^{-3}$ to 2.

8. A process according to claim 1, said isomerizing being conducted at −20° to 75°C.

9. A process according to claim 1, said isomerizing being conducted at less than 150°C.

10. A process according to claim 7, wherein the molar ratio is in the range of 0.01 to 0.08.

11. A process according to claim 10, said isomerizing being conducted at −20° to 75°C.

12. A process according to claim 11 wherein the cation is present in the form of a fluoride and the isomerizing process is conducted under a partial pressure of hydrogen.

\* \* \* \* \*